(12) United States Patent
Barzegar et al.

(10) Patent No.: US 7,742,498 B2
(45) Date of Patent: Jun. 22, 2010

(54) METHOD AND APPARATUS FOR ROUTING A CALL TO A DUAL MODE WIRELESS DEVICE

(75) Inventors: Farhad Barzegar, Branchburg, NJ (US); Irwin Gerszberg, Kendall Park, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 991 days.

(21) Appl. No.: 11/131,029

(22) Filed: May 17, 2005

(65) Prior Publication Data

US 2006/0268928 A1 Nov. 30, 2006

(51) Int. Cl.
*H04L 12/50* (2006.01)
(52) U.S. Cl. ...................................... 370/465; 370/331
(58) Field of Classification Search ................. 370/465, 370/331
See application file for complete search history.

(56) References Cited

U.S. PATENT DOCUMENTS

| | | | | |
|---|---|---|---|---|
| 5,873,033 | A * | 2/1999 | Hjern et al. | 455/417 |
| 6,418,324 | B1 | 7/2002 | Doviak et al. | |
| 6,708,028 | B1 * | 3/2004 | Byrne | 455/426.1 |
| 6,732,176 | B1 | 5/2004 | Stewart et al. | |
| 6,826,405 | B2 | 11/2004 | Doviak et al. | |
| 2002/0147008 | A1 * | 10/2002 | Kallio | 455/426 |
| 2003/0125028 | A1 * | 7/2003 | Reynolds | 455/437 |
| 2004/0105434 | A1 * | 6/2004 | Baw | 370/355 |
| 2004/0153518 | A1 | 8/2004 | Seligmann et al. | |
| 2004/0203788 | A1 * | 10/2004 | Fors et al. | 455/439 |
| 2004/0236745 | A1 * | 11/2004 | Keohane et al. | 707/9 |
| 2005/0105497 | A1 * | 5/2005 | Belkin et al. | 370/338 |
| 2005/0107094 | A1 * | 5/2005 | Hulkkonen et al. | 455/456.5 |
| 2006/0083199 | A1 * | 4/2006 | Yang | 370/331 |

(Continued)

FOREIGN PATENT DOCUMENTS

WO    WO 03/096559 A1    11/2003
WO    WO 2004/082219 A2    9/2004

OTHER PUBLICATIONS

T. Al-Gizawi, et al., "Evaluation of Interoperability Criteria and Mechanisms for Seamless Inter-Working Between UMTS-HSDPA and WLAN Networks Enhanced with MIMO Techniques", Wireless Personal Communications, Springer, Dordrecht, NL, vol. 30, No. 2-4, Sep. 2004, pp. 119-129.

(Continued)

*Primary Examiner*—Ricky Ngo
*Assistant Examiner*—Luat Phung

(57) ABSTRACT

Disclosed is a system and method for routing a call to a dual mode wireless device. In accordance with an embodiment of the invention, a network node receives a call. The network node determines that the call is associated with a dual mode wireless device. Once this determination is made, the network node then selects one of a plurality of networks (e.g., cellular network or packet-based network, such as a VoIP network) for use in connecting the call to the dual mode wireless device. The network node then routes the call to the dual mode wireless device via the selected network. During the call, the network node re-routes the call to another network if the network node determines that this other network is now better suited for the call.

21 Claims, 4 Drawing Sheets

U.S. PATENT DOCUMENTS

2006/0205407 A1* 9/2006 Jagadeesan et al. ......... 455/436
2006/0205436 A1* 9/2006 Liu et al. .................... 455/560
2006/0276193 A1* 12/2006 Itzkovitz et al. ............. 455/445
2007/0047504 A1* 3/2007 Akram et al. ............... 370/338
2008/0058003 A1* 3/2008 Rydnell et al. ........... 455/552.1

OTHER PUBLICATIONS

European Patent Office Search Report for Corresponding European Patent Application No. 06113169.4, 3 pages.

* cited by examiner

FIG. 2

| DUAL MODE WIRELESS DEVICE NUMBER | NETWORK INFORMATION | | | | PREFERRED NETWORK |
|---|---|---|---|---|---|
| | CAPACITY OF PACKET-BASED NETWORK | CAPACITY OF CELLULAR NETWORK | STRENGTH OF CELLULAR SIGNAL IN AREA | STRENGTH OF PACKET-BASED SIGNAL IN AREA | |
| 965-1589 | 54 Mb/sec | 200 Kb/sec | STRONG | STRONG | PACKET-BASED |
| 536-8788 | 48 Mb/sec | 100 Kb/sec | WEAK | AVERAGE | PACKET-BASED |
| 226-1330 | 11 Mb/sec | 175 Kb/sec | AVERAGE | WEAK | CELLULAR |

202 / 204 / 206 / 208 / 210 / 212

214, 216, 218

200

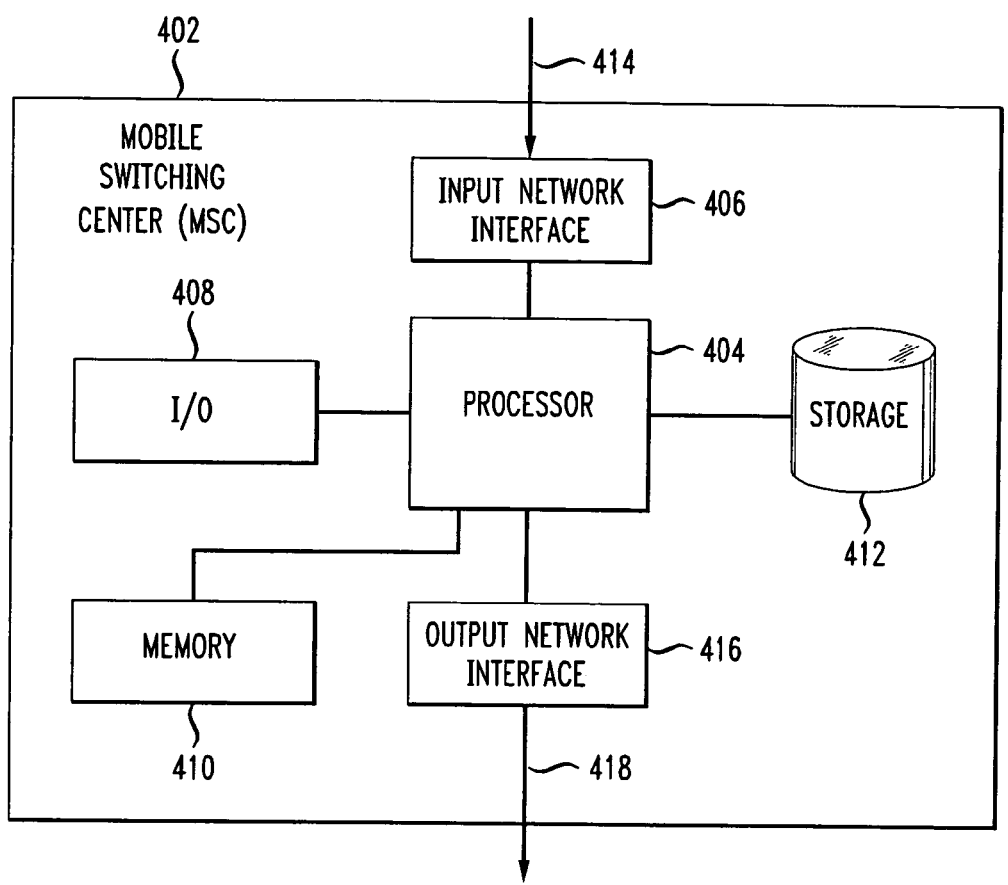

METHOD AND APPARATUS FOR ROUTING A CALL TO A DUAL MODE WIRELESS DEVICE

BACKGROUND OF THE INVENTION

The present invention relates generally to routing a call to a dual mode wireless device, and more particularly to selecting a network for a call to the dual mode wireless device.

Wireless communications has been one of the most active areas of technology development. Wireless communications today covers a wide array of applications. The largest and most noticeable part of the telecommunications business is telephony. The worldwide growth rate in wireless telephony has been very aggressive over the past decade. Wireless phones today can now support voice as well as other services, such as the transmission of video, images, text, and data.

Another wireless technology that has grown in popularity is wireless local area network (LAN) systems, exemplified by the IEEE 802.11, called wireless fidelity, or "Wi-Fi", systems. In particular, Wi-Fi has gained acceptance in many businesses, agencies, schools, and homes as an alternative to a wired local area network (LAN). Further, many airports, hotels, cafes, and other facilities now offer public access to Wi-Fi networks (i.e., hot spots).

Devices have been introduced that integrate cellular technology with Wi-Fi technology. Specifically, these dual mode wireless devices, often called "smartphones", can send and receive signals via a cellular network or via a packet based network, such as the Internet (e.g., Voice over Internet Protocol (VoIP)).

Wireless carriers have enabled customers having a dual mode wireless device to switch between packet-based and cellular networking from the dual mode wireless device. The determination of which network to use for a call may depend on characteristics such as which technology is available for the call and the cheapest technology available for the call.

A customer's selection of a network, however, introduces an additional problem—the customer may not choose the "best" available network (e.g., in terms of network coverage or cost of calls on the network). For example, a customer may select a network to handle a call based on an incorrect perception that the selection results in cheaper services. This perception may be based on an incorrect belief that one network is always cheaper than another network.

To alleviate this problem, the dual mode wireless device may provide information to help the customer select the best network available. For example, the dual mode wireless device may provide an estimate of the charges associated with each available network for the call. The dual mode wireless device may also provide a signal strength associated with each available network. Even with such information, however, the customer may not choose the cheapest available network or the network with the strongest signal. For one, the customer may misread the information provided by the dual mode wireless device. Second, the customer may choose to ignore the provided estimates/information.

A recent solution to the problems associated with a customer selecting the network is an automatic selection of the network at the start of the call by the dual mode wireless device. Thus, the dual mode wireless device determines, for example, which network has the strongest signal and/or which network will provide the cheapest call for the customer upon the customer's dialing of the called party.

BRIEF SUMMARY OF THE INVENTION

While the prior approaches provide some control over the network selected by a dual mode wireless device, they fail to address the problem of maintaining the best network (e.g., cheapest network, network providing the strongest signal, network with the largest capacity) for the call throughout the call. In particular, the network selection at the start of the call may not be the best selection throughout the call. For example, the signal strength of a particular network may vary as the dual mode wireless device moves around during the call. Additionally, the cost of the call may vary as the dual mode wireless device changes location. For example, when a call is taking place on the cellular network, a caller may initially start out in an area that will charge a local rate for the call. The customer may then, during the same call, travel to an area that results in roaming charges for the call. Thus, the selection of the cellular network at the start of the call may start out as the cheapest selection but may not remain the cheapest selection throughout the call.

The present invention provides for a method and apparatus for routing a call to a dual mode wireless device. In accordance with an embodiment of the invention, a network node, or mobile switching center, receives a call. The network node determines that the call is associated with a dual mode wireless device. Once this determination is made, the network node then selects one of a plurality of networks (e.g., cellular network or packet-based network) for use in connecting the call to the dual mode wireless device. The network node then routes the call to the dual mode wireless device via the selected network. During the call, the network node re-routes the call to another network if the network node determines that this other network is now better suited for the call.

In one embodiment, the network node determines that another network is better suited for the call from device status information, such as the location of the dual mode wireless device, the strength of one or more signals received by the dual mode wireless device from each available network, and the cost associated with the call on the network. The network node may poll the dual mode wireless device to obtain this information. The network node may also use network information to make this determination, such as capacity of the network and coverage of the network in a particular area. The network node may also communicate with the network (e.g., with a wireless access point to obtain information about the packet-based network or a base station to obtain information about a cellular network).

These and other advantages of the invention will be apparent to those of ordinary skill in the art by reference to the following detailed description and the accompanying drawings.

BRIEF DESCRIPTION OF THE DRAWINGS

FIG. 2 shows a data structure which may be used to store network information in a database;

FIG. 4 shows a high level block diagram of a mobile switching center which may be used in an embodiment of the invention.

DETAILED DESCRIPTION

Figure 1:
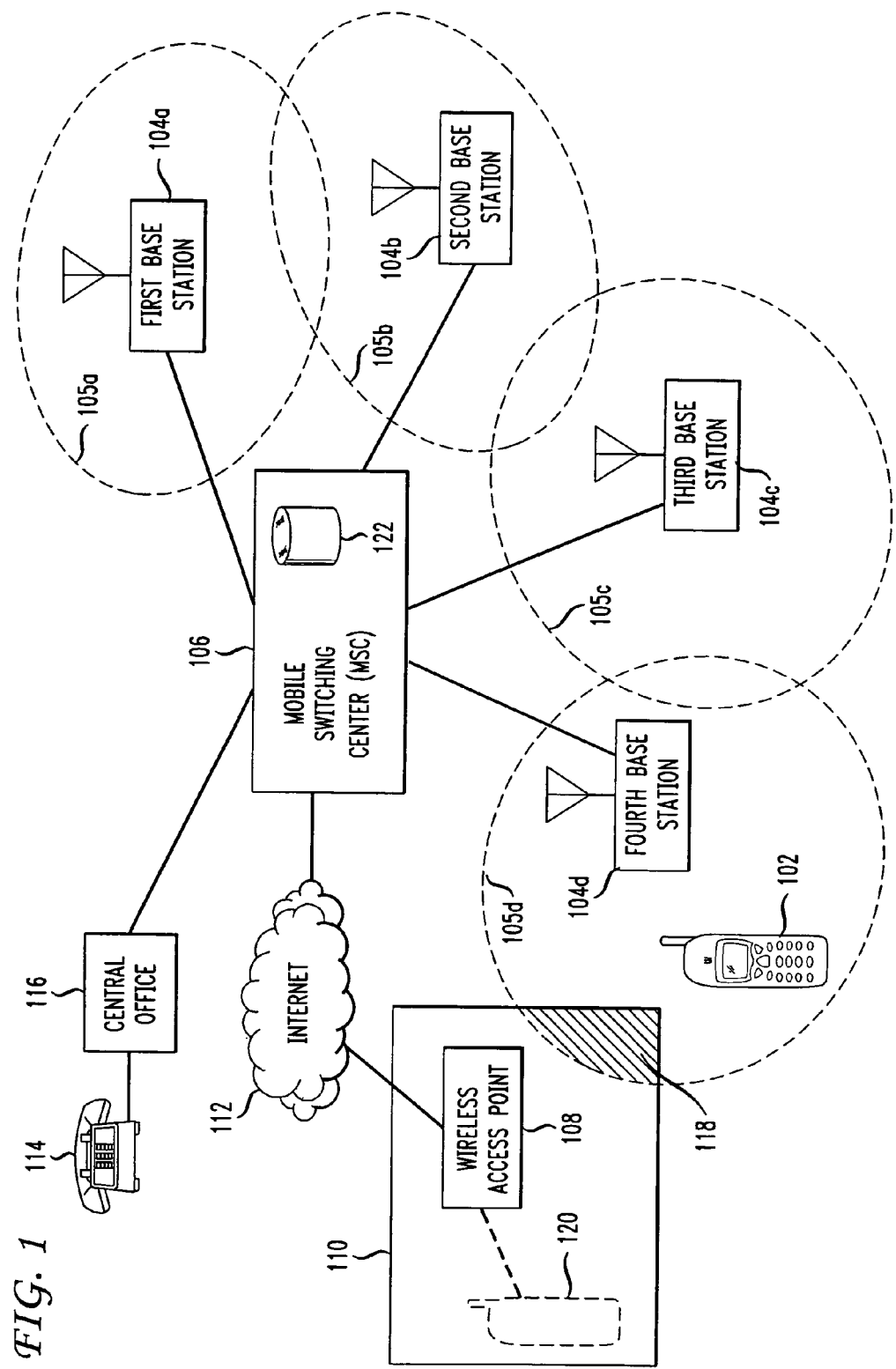
FIG. 1 shows a high level block diagram of a mobile switching center in accordance with an embodiment of the invention.

FIG. 1 shows a high level block diagram of a network architecture in accordance with the principles of the present invention. Further details regarding particular embodiments of the invention will be described in further detail in connection with FIGS. 2-4. FIG. 1 shows a dual mode wireless device 102 that can communicate via a packet-based network (e.g., wireless fidelity, or WiFi) or via a cellular network (e.g., using Code Division Multiple Access (CDMA), Time Division Multiplexing (TDMA), etc.). The cellular network includes a first base station 104a, a second base station 104b, a third base station 104c, and a fourth base station 104d (generally 104). Each base station 104 is located within a respective cell site 105a, 105b, 105c, 105d (generally 105) and transmits and receives mobile calls from the cell site's antenna. Thus, a device in a cell site transmits and receives call information to/from the respective base station. Each base station 104 communicates with, and is controlled by, a mobile switching center (MSC) 106. The MSC 106 switches between the cellular network and the public switched telephone network (PSTN). The mobile switching center 106 also communicates with a wireless access point (WAP) 108 in a local area network (LAN) 110 via the Internet 112. In particular, the MSC 106 receives a call directed to the LAN 110, converts the data to packets, and then sends the packets over the Internet 112 to the LAN 110.

The present invention provides a method and apparatus for routing a call to the dual mode wireless device 102. Consider landline telephone 114 connected to central office (CO) 116. The CO 116 communicates with the MSC 106. When a user of the landline telephone 114 calls a dual mode wireless device 102, the call is routed to the MSC 106 in a well known manner. A typical MSC directs the call to the fourth base station 104d because the device 102 is located in the fourth cell site 105d. If the user of the dual mode wireless device 102 travels to an area that enables the dual mode wireless device 102 to communicate via either the LAN 110 or a cellular network, such as in area 118, the MSC traditionally maintains the call on the network that the call was started on (i.e., the cellular network). Moreover, if the dual mode wireless device automatically selects (or if the user had chosen) the cellular network at the start of the call, the dual mode wireless device uses the cellular network for the duration of the call as long as the cellular network is available (and provides an adequate signal strength). Thus, the dual mode wireless device may not use the best available network (e.g., the network providing the cheapest rate or the network providing the strongest signal) throughout the duration of the call.

In accordance with the principles of the present invention, MSC 106 is configured to dynamically route the call to the dual mode wireless device 102. The MSC's routing of the call can be based on a variety of factors, such as the device's location, the network with better coverage in a given geographic area, or the network that provides more capacity. For example, if the dual:mode wireless device 102 is in a first position only within the first cellular site 105a, then the MSC 106 routes the call to the first base station 104a. Similarly, if the dual mode wireless device 102 is in a second position 120 only within the LAN 110, the MSC 106 routes the call to the device 102 using VoIP (i.e., the LAN 110). If the dual mode wireless device 102 is in area 118 where both the wireless access point 108 and the fourth base station 104d can transmit and receive information to the device 102, the MSC 106 selects the best available network for the call.

If a user of the dual mode wireless device 102 moves from the LAN 110 to the cellular network, the MSC 106 re-routes the call to the cellular network (e.g., the fourth cell site 105d). If the user then moves back into coverage of the LAN 110 (e.g., area 118), the MSC 106 may re-route the call to the packet-based network (i.e., LAN 110) if characteristics of the packet-based network (e.g., the coverage and capacity offered by the LAN 110) demonstrate that the LAN 110 is now better suited for the call. Thus, the MSC 106 enables the call to continue on the dual mode wireless device 102 uninterrupted while switching the call from one network (the cellular network) to another network (LAN 110). Consequently, the "best" available network is chosen for the entire call rather than only at the start of the call.

The automatic selection of which network to use for the call is performed by the MSC 106. Thus, the selection of a network occurs transparently to the user of the dual mode wireless device 102. The user does not have to remember to select anything at the start of the call or during the call. To determine the best available network for a call, the MSC 106 polls the dual mode wireless device 102 periodically (e.g., once every thirty seconds) to determine if a better route exists for the call. Moreover, the MSC 106 knows the location of the device 102 and stores it in a well known manner. Thus, if the call can take place using several networks, the MSC 106 determines which network to use for the call at that time based on particular characteristics of the network and the dual mode wireless device 102.

In one embodiment, the MSC 106 performs a database lookup of database 122 to determine the best network for the call. As described in more detail below, the database 122 stores, for example, characteristics of each network. It is noted that database 122 is shown as an internal component of MSC 106 (e.g., stored in internal memory or storage). However, in various alternative embodiments, the database 122 may be an externally connected device or may be a standalone node which the MSC 106 accesses via a network interface.

FIG. 2 shows one embodiment of a data structure which may be stored in the dual mode wireless device's database 122 for the MSC's determination of a preferred network. In accordance with the embodiment of FIG. 2, the database 122 contains a relational database 200 containing multiple records, with each record comprising multiple fields. Field 202 identifies the telephone number of the dual mode wireless device 102. The MSC 106 stores a list of numbers in its database 200 so that the MSC 106 can determine whether the called number is directed to a dual mode wireless device. If the called number is directed to a dual mode wireless device (e.g., dual mode wireless device 102), the MSC 106 then determines a preferred network for the call.

Once the MSC 106 establishes that the call is to the dual mode wireless device 102, the MSC 106 then determines the location of the dual mode wireless device 102. The MSC 106 uses the device's location in its determination of the network.

The MSC 106 stores network information associated with each network in its database 200. For example, the MSC 106 communicates with the WAP 108 to determine the LAN's network capacity 204. For example, a first LAN 110 may have a network capacity of 54 Mbits/second while a second LAN may have a network capacity of 48 Mbits/second. Similarly, the MSC 106 communicates with each base station 104 to determine each cell's network capacity 206. For example, the first cell site 105a may have a network capacity of 200 Kbits/second while the second cell site 105b may have a network capacity of 100 Kbits/second.

To determine a preferred network 212, the MSC 106 may also determine the signal strength in each network. In one embodiment, the MSC 106 receives from the device 102 (e.g., periodically or in response to a request by the MSC 106) signal information, such as the strength of the network signal(s) 208, 210 that the dual mode wireless device 102 receives at its location. The MSC 106 may receive from the dual mode wireless device a power level of the signal(s) that the dual mode wireless device 102 receives in a particular area. In one embodiment, the MSC 106 associates a flag with the power level, such as "Strong", "Average", and "Weak". Based on the network information 204-210, the MSC 106 designates a network as a preferred network.

Thus, when the MSC 106 receives a call for the dual mode wireless device 102, the MSC 106 checks its database 200 to determine the preferred network for the device 102. Then, throughout the call, the MSC 106 may obtain new information (from the networks (e.g., a base station 104 and/or the LAN 110) or from the dual mode wireless device 102 via polling of the device 102. This information may result in the MSC 106 changing the network used for the call and/or an updating of the database 200.

251 Records 214-216 show exemplary records which may be stored in database 122. For example, record 214 indicates that a dual mode wireless device having a telephone number of 965-1589 is in the vicinity of both a cellular network and a packet-based network because the strength of the signals from both networks has a "Strong" designation. The packet-based network has a capacity of 500 Mbits/second and the cellular network has a capacity of 200 Kbits/second. The signal strength for both networks has been classified as "Strong" and the MSC 106 has designated the packet-based network as the best network for a call to that dual mode wireless device.

Further, the dual mode wireless device 102 may, transparent to the user, update the MSC 106 with device status information (e.g., location, strength of signals received from one or more networks, charging status for call (e.g., local or roaming) periodically. The MSC 106 may use this information in its determination of the preferred network 212.

Moreover, the MSC 106 may designate a network as a preferred network based on security concerns. For example, if the MSC 106 determines that a dual mode wireless device 102 is located in a secure location, and if both a cellular network and a packet-based network (e.g., LAN 110) are available for the same call, the MSC 106 may always designate the packet-based network as the preferred network for any calls to the dual mode wireless device 102 for security reasons (e.g., if, for instance, all information transmitted over the packet-based network is encrypted, etc.)

Figure 3:
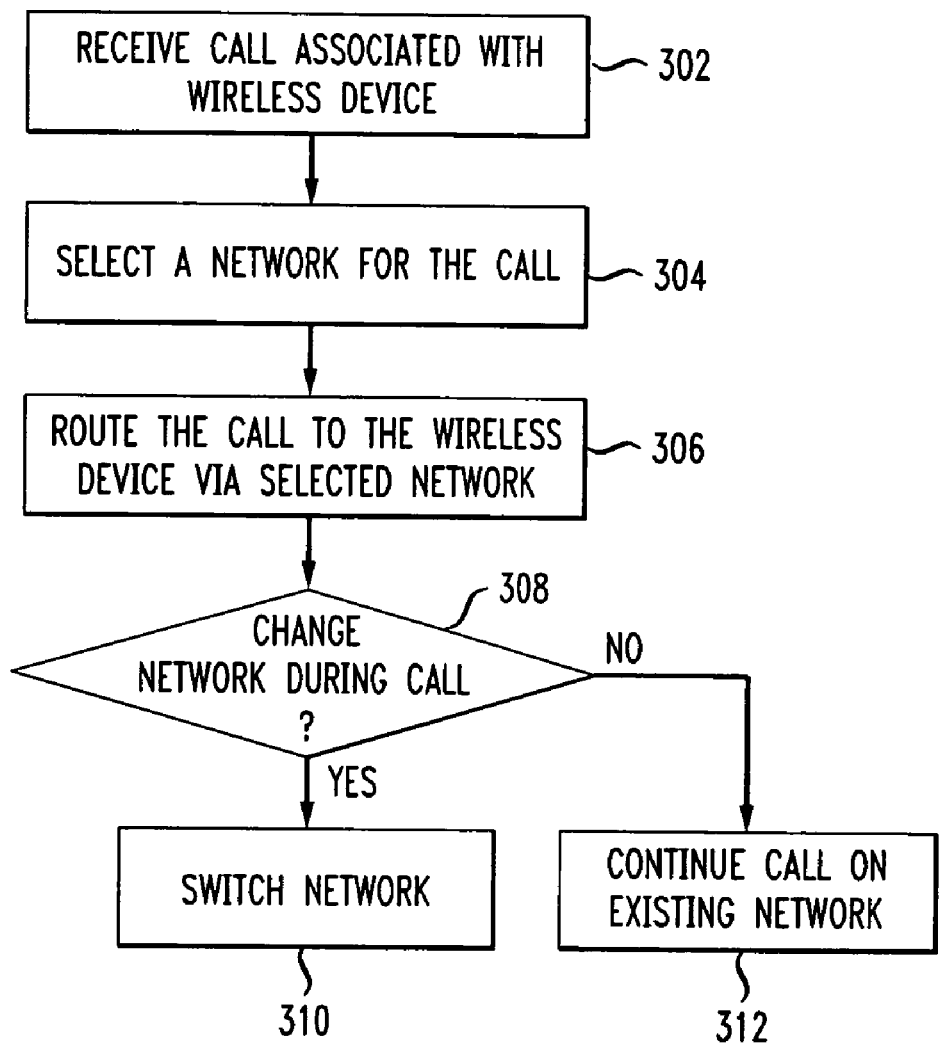
FIG. 3 is a flowchart showing the steps performed by the mobile switching center in accordance with an embodiment of the invention.

The steps performed by MSC 106 will now be described in further detail in connection with the flowchart of FIG. 3. First, in step 302, the MSC 106 receives a call. For example, the MSC 106 receives a request from telephone 114 to connect to a dual mode wireless device. The MSC 106 determines that the call is associated with a dual mode wireless device 102 by locating the called number in its database 200. The MSC 106 then obtains the location of the dual mode wireless device 102. The MSC 106 then selects a network to use for the call, as shown in step 304. The MSC 106 performs a database lookup to obtain the preferred network for the call. In step 306, the MSC 106 routes the call to the dual mode wireless device via the preferred network. The MSC 106 then polls, in step 308, the dual mode wireless device during the call to determine whether to change the network used for the call. As described above, this determination may be based on the capacity of the wireless network, the strength of the signal in the particular area, and/or the cost associated with the network during the time of the call.

Thus, the MSC 106 automatically selects the network at the start of the call and then periodically checks whether a better network exists for the same call. If a better network exists for the same call, the MSC 106 transparently hands off the call to the better network (in step 310). If the MSC 106 determines that there is no better network currently available for the call, the MSC continues the call on the existing network, as shown in step 312.

A high level block diagram of a computer implementation of the MSC is shown in FIG. 4. MSC 402 contains a processor 404 which controls the overall operation of the computer by executing computer program instructions which define such operation. The computer program instructions may be stored in a storage device 412 (e.g., magnetic disk, database) and loaded into memory 410 when execution of the computer program instructions is desired. Thus, the MSC operation will be defined by computer program instructions stored in memory 410 and/or storage 412 and the computer will be controlled by processor 404 executing the computer program instructions. Computer 402 also includes one or more input network interfaces 406 for communicating with other devices via a network (e.g., the Internet) and for receiving call information (e.g., called number) 414. Computer 402 also includes one or more output network interfaces 416 for communicating with other devices and for transmitting the call information (e.g., voice packets) to other devices (e.g., wireless access point 108). MSC 402 also includes input/output 408 which represents devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for routing a call to a dual mode wireless device that communicates over one of a cellular network and a packet-based network, the method comprising the steps of:

receiving said call at a network node;

selecting one of a plurality of networks for use in connecting said call to said dual mode wireless device;

routing said call to said dual mode wireless device via said selected network; and handing-off said call to said dual mode wireless device via another of said plurality of networks during said call, said handing-off based on:

a) a cost analysis including a comparison of a cost associated with said call on said another of said plurality of networks relative to a cost associated with said call on said one of said plurality of networks, the cost analysis being performed by the network node, b) a data security preference, and c) a capacity of each of the plurality of networks, said capacity based on information in a database and communication between the network node and the plurality of networks.

2. The method of claim 1 further comprising the step of receiving at least one of dual mode wireless device status information and network information for one of said plurality of networks.

3. The method of claim 2 wherein said device status information further comprises at least one of location of said dual mode wireless device, strength of one or more signals received by said dual mode wireless device, and cost associated with said call on said one of a plurality of networks.

4. The method of claim 2 wherein said network information further comprises at least one of capacity of one of said plurality of networks and coverage of one of said plurality of networks in a particular area.

5. The method of claim 1 wherein said handing-off step further comprises selecting said another of said plurality of networks.

6. The method of claim 5 wherein said selecting said another of said plurality of networks further comprises receiving one of device status information and network information for said another of said plurality of networks.

7. The method of claim 1 wherein said handing-off step further comprises polling said dual mode wireless device for at least one of device status information and network information.

8. A method for routing a call to a dual mode wireless device that communicates over one of a cellular network and a packet-based network, the method comprising the steps of:
   receiving said call at a network node;
   selecting one of a plurality of networks for use in connecting said call to said dual mode wireless device;
   routing said call to said dual mode wireless device via said selected network; and
   determining whether to hand-off said call to another of said plurality of networks during said call, said determining based on:
   a) a cost analysis including a comparison of a cost associated with said call on said another of said plurality of networks relative to a cost associated with said call on said one of said plurality of networks, the cost analysis being performed by the network node,
   b) a data security preference, and
   c) a capacity of each of the plurality of networks, said capacity based on information in a database and communication between the network node and the plurality of networks.

9. The method of claim 8 further comprising receiving at least one of dual mode wireless device status information and network information for one of said plurality of networks.

10. The method of claim 9 wherein said device status information further comprises at least one of location of said dual mode wireless device, strength of one or more signals received by said dual mode wireless device, and cost associated with said call on said one of a plurality of networks.

11. The method of claim 9 wherein said network information further comprises at least one of capacity of one of said plurality of networks and coverage of one of said plurality of networks in a particular area.

12. The method of claim 8 wherein said determining step further comprises polling said dual mode wireless device.

13. The method of claim 8 wherein said determining step further comprises handing-off said call to said another of said plurality of networks.

14. A network node for routing calls associated with a dual mode wireless device that communicates over one of a cellular network and a packet-based network comprising:
   means for receiving said call at a network node;
   means for selecting a network for use by said dual mode wireless device;
   means for routing said call to said dual mode wireless device over said selected network; and
   means for determining at the network node whether to change said selected network to another network during said call, said means for determining comprising:
   a) means for determining how a cost associated with said call on said another network compares with a cost associated with said call on said selected network,
   b) means for determining if said another network is preferred over said selected network for data security reasons, and
   c) means for determining if said another network is preferred over said selected network based on a capacity of said selected network and a capacity of said another network, said capacity of said selected network and said capacity of said another network based on information in a database and communication between the network node and the plurality of networks.

15. The network node of claim 14 further comprising means for receiving at least one of dual mode wireless device status information and network information for one of a plurality of networks.

16. The network node of claim 15 wherein said dual mode wireless device status information further comprises at least one of location of said dual mode wireless device, strength of one or more signals received by said dual mode wireless device, and cost associated with said call on said one of a plurality of networks.

17. The network node of claim 15 wherein said network information further comprises at least one of capacity of said selected network and coverage of said selected network in a particular area.

18. The network node of claim 14 wherein said means for determining whether to change said selected network further comprises means for handing-off said call to said another network.

19. The method of claim 1 further comprising designating a preferred network for security reasons based on an encryption status of the preferred network;
   wherein the data security preference indicates the preferred network.

20. The method of claim 8 further comprising designating a preferred network for security reasons based on an encryption status of the preferred network;
   wherein the data security preference indicates the preferred network.

21. The network node of claim 14 wherein said data security reasons include an encryption status of at least one of said selected network and said another network.

* * * * *